March 26, 1968

A. T. HARRIS 3,375,316

ELECTRIC ARC FURNACE FOR THE PREPARATION OF ACETYLENE
BY PYROLYSIS OF HYDROCARBONS

Filed Aug. 18, 1964

INVENTOR
ALEXANDER THOMAS HARRIS,

BY Edwin Tocker

AGENT

INVENTOR
ALEXANDER THOMAS HARRIS,

BY Edwin Vocker

AGENT

United States Patent Office 3,375,316
Patented Mar. 26, 1968

3,375,316
ELECTRIC ARC FURNACE FOR THE PREPARATION OF ACETYLENE BY PYROLYSIS OF HYDROCARBONS
Alexander Thomas Harris, Claymont, Del., assignor to E. I. du Pont de Nemours and Company, Wilmington, Del., a corporation of Delaware
Filed Aug. 18, 1964, Ser. No. 390,287
6 Claims. (Cl. 13—9)

ABSTRACT OF THE DISCLOSURE

The apparatus herein described and claimed relates to improvements in an electric arc furnace which may be used for pyrolysis of hydrocarbons and more particularly, to an improved outer electrode for this furnace, which electrode has longer life and facilitates removal of carbon deposits forming thereon during operation of the furnace.

---

In a furnace of this type, an electric arc is maintained between a central rod-shaped electrode and a surrounding or outer electrode, and this arc is electromagnetically rotated about the central electrode, whereby the arc travels in a path along the inner surface of the outer electrode. Such an arc furnace and its use to pyrolyze hydrocarbons to acetylene is described in U.S. Patent No. 3,073,769, to Doukas, which describes operating conditions for minimizing the formation of carbon deposits on the central electrode during pyrolysis. Unfortunately, in the zone and just below where the arc strikes the outer electrode, carbon deposits continue to form. These deposits are dense, hard, and adherent to the electrode wall and their continual buildup have the deleterious effects of decreasing the arc length, arc voltage, power input, and effective cross section of the arc furnace to thereby decrease the productivity of the pyrolysis reaction. Fluffy carbon deposits also form downstream from this zone and have similar adverse effects on furnace operation.

It is known to remove both the hard and the fluffy carbon deposits by intermittently contacting them with scraping devices.

Although the use of such scraping devices eliminates the shut-downs which would otherwise be necessary for removing the carbon by hand, experience with their continuous operation for long periods brings out the fact that the outer electrode, when made of copper, for good electrical and thermal conductivity, is eroded at a fairly rapid rate at the zone at which the arc strikes it. Thus, cooling water passages within it eventually become exposed resulting in undesirable leakage of the cooling water into the arc furnace. When this occurs, the furnace must be shut down and the section of the outer electrode replaced. When metals which are more refractory than copper, such as molybdenum and tungsten and their alloys, are used as the material of construction for the anode, it is found that although these metals are more resistant to arc erosion, the hard carbon deposits formed thereon are harder to remove with scraping devices than from copper and that the refractory metals tend to crack in use, again causing leakage of cooling water into the interior of the furnace. The fluffy carbon deposits do not present any problem of removal from the electrode surface by scraping devices.

It is an object of the present invention to provide an improved outer electrode which facilitates the removal of hard carbon deposits without physical impairment of the electrode. Other objects will appear hereinafter.

These and other objects of the present invention will be better understood by reference to the following description and accompanying drawings in which.

Figure 1:
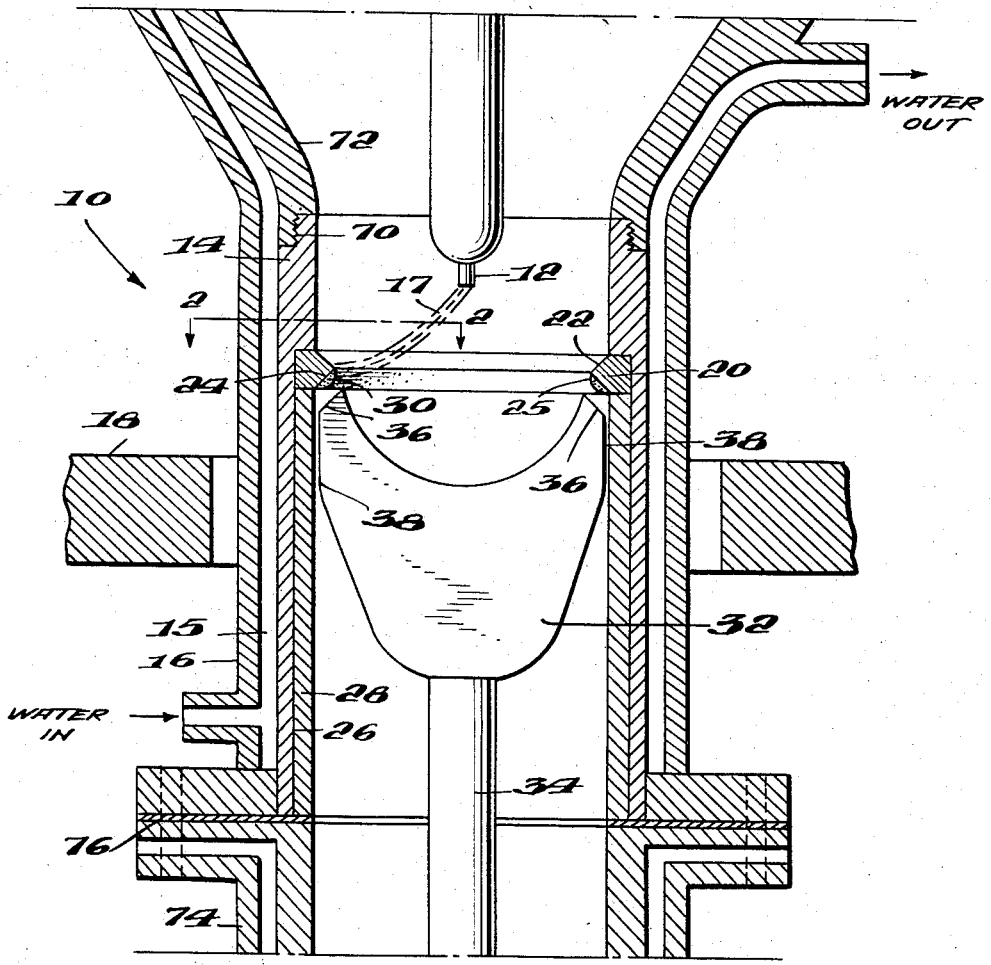
FIG. 1 depicts a schematic vertical section of a portion of an arc furnace incorporating an improved outer electrode of the present invention.
Figure 2:
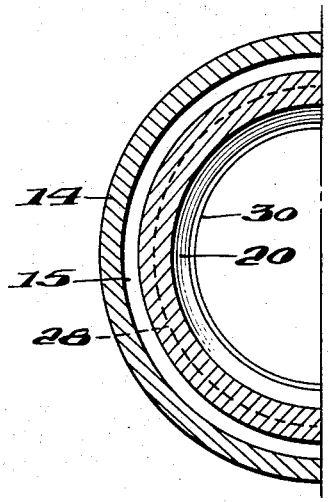
FIG. 2 is a partial plan view taken along line 2—2 of FIG. 1.

The arc furnace shown in FIG. 1 is designated as 10. Such a furnace is also depicted in U.S. Patent No. 3,073,-769. Concentrically positioned within this furnace are the central electrode 12 and outer cylindrical electrode 14, which in this instance are the cathode and anode, respectively. A concentric cooling passage 15 is provided between the anode and the outer wall 16 of the arc furnace; the cathode is also water cooled. An arc 17 is struck and maintained between these electrodes and is rotated by an electromagnetic field induced within the anode 14 by an electromagnet 18 which is positioned transverse to the furnace 10 as shown. Hydrocarbon material which is to be pyrolyzed to acetylene is fed into the furnace to flow downward between the electrodes 12 and 14 and through the rotating arc 17.

During such operation, a hard carbon deposit forms an annular ring extending along the path travelled by the arc over the inner cylindrical surface of the anode. It is the removal of this hard carbon deposit that has caused the difficulties previously explained for different materials of anode construction.

In the present invention, instead of having the inner surface of anode 14 of uniform diameter in the region of arc strike according to conventional practice, an anode ring structure 20 is positioned transversely to the longitudinal axis of the arc furnace 10 and in the annular path traversed by the arc 17. This ring structure has a portion defined by upper and lower walls 22 and 24, respectively, extending into the interior of the furnace, beyond the inner surface of anode 14, and converging to form an apex 25.

The ring structure 20 is positioned at the upper end of an annular recess 26 in the anode 14. An annular retaining sleeve 28 is positioned in the remainder of the recess 26 and has its upper edge abutting the lower edge of the ring structure. Contact between the ring structure 20 and anode 14 is obtained such as by shrink fitting or brazing these elements together. As a result of this contact, the ring structure 20 becomes the arc-strike surface for the anode 14 and is cooled in the same manner thereas.

The arc-strike zone is generally confined to the upper wall 22 and apex 25 of the ring structure. Unexpectedly, the hard carbon deposit 30, which usually forms at and just below the arc-strike zone, forms almost entirely on the lower converging wall 24 of the ring structure 20. Again, unexpectedly, the hard carbon deposit is more easily removed from the wall 24 than from the straight sided anode walls of the past. This easier removal is attributed in part to the general confinement of the hard carbon deposit to the lower wall 24 and thus the small area of contact between this wall and the carbon deposit. Thus, the more brittle but arc-erosion resistant refractory metals can be employed instead of copper to construct the ring structure 20, with the result being longer anode life and furnace operation. Although, the drawings illustrate a relative operable size relationship between ring structure 20 and furnace 10, the optimum relationship will depend on the particular size furnace and hydrocarbon feed material utilized as well as upon any other operating variable that effects carbon formation.

Removal of the hard carbon deposit 30 can be obtained by periodic scraping by a scraping member 32, which is only representative of the many suitable mechanical devices that might be employed. The particular scraping member shown has a rectangular cross-section and is mounted upon a post 34 which drives the scraping member 32 into the carbon deposit 30 in reciprocating and rotating fashion. Apparatus for driving scraping member 32 and additional forms of scrapers are disclosed in patent application U.S. Ser. No. 245,070, filed Dec. 17, 1962, now Patent No. 3,185,754 to Doukas and Reed.

Removal of the deposit 30 is obtained by driving the scraping member 32 upward at any desired frequency and by the scraping action of a pair of chisel-like beveled edges 36 formed along the upper-most edges of the rotating scraping member 32. The fact that the deposit is generally confined to the lower wall 24 minimizes the area of contact between the scraping member and the deposit to thereby further facilitate removal of the deposit. Further scraping away of any hard carbon deposit which may form on the retaining sleeve 28 can be obtained by the lateral edges 38 of the scraping member, which edges lie proximate and parallel for a short distance to the inner surface of the anode. The upward stroke of the scraping member 32 is stopped short of making contact with the wall 24 of the ring structure 20 by the driving apparatus shown in the above-referrred to patent application. Accordingly, the scraping member remains substantially clear of the arc-strike zone encompassing the apex 25 and wall 22 of the ring structure. In contrast, when smooth bore anodes of the prior art are used, the scraper must pass through the arc-strike zone to remove the hard carbon deposits. When the scraping member 32 is retracted, it will remove downstream loose carbon deposits.

Figure 3:
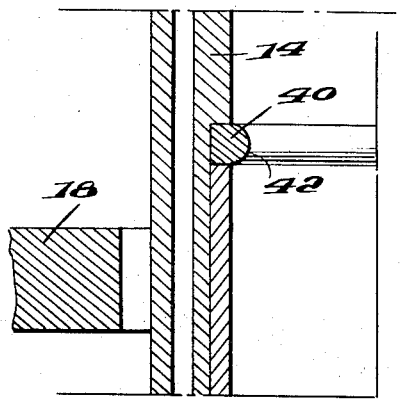
FIGS. 3–5 depict a partial side elevation in section of other embodiments of improved electrodes according to the present invention.

The clearance between the beveled edges 36 of the scraping member 32 and the wall 24 of the ring structure 20 need not be too close or in conformity in order to obtain adequate scraping. Accordingly, the space between the edges 36 and wall 24 can be angular instead of the parallel spacing illustrated. Similarly, the wall 24 can be the lower arcuate surface of a rounded or semi-circular projection 42 of the ring structure 40 shown in FIG. 3, and the beveled edges 36 of the scraping member 32 would still be suitable. As a matter of fact, after lengthy use of the ring structure 20 of FIG. 1, the apex 25 which is the common boundary between the converging walls 22 and 24 becomes rounded, but would still be satisfactorily scraped by the scraping member 32.

Figure 4:
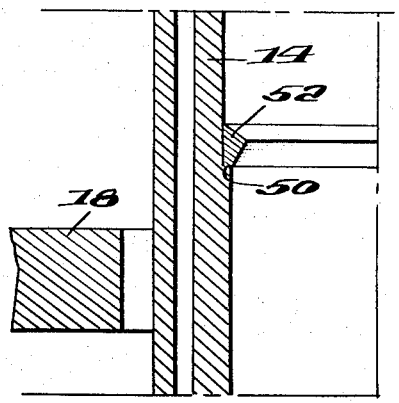

With respect to the manner of positioning the ring structure within the anode 14, FIG. 4 depicts an alternative arrangement in which the anode has a shoulder 50 for abutting a ring structure 52 shrunk-fit for integral connection to the wider diameter anode 14.

Figure 5:
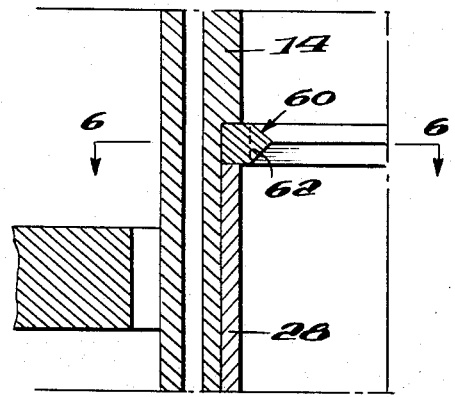
Figure 6:
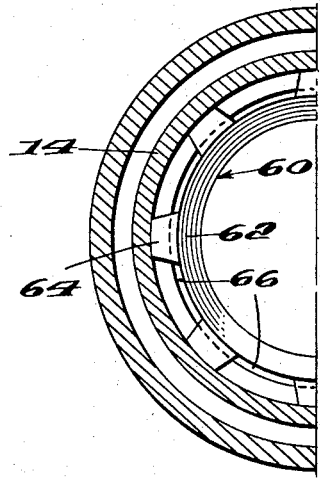
FIG. 6 shows a plan view taken along line 6—6 of FIG. 5.

FIGS. 5 and 6 depict another embodiment, in which the ring structure 60 has an inwardly extending triangular portion 62 similar to ring structure 20, but this inwardly extending portion is in electrically conducting securement to the inner wall of anode 14 by eight equally spaced peripheral lugs 64, one of which is shown in FIG. 6, sandwiched between the upper end of the annular recess 26 in anode 14 and the upper end of retaining sleeve 28 as shown in FIG. 5. The ring structure 60 is fabricated so that the lugs 64 space the entire triangular portion 62 inwardly from the surface of the anode 14 to form slots 66 therebetween. Passage of feed gas through the slots 66 suppresses the formation of hard carbon deposits on the sleeve 28 in the vicinity of the ring structure 60.

Figure 7:
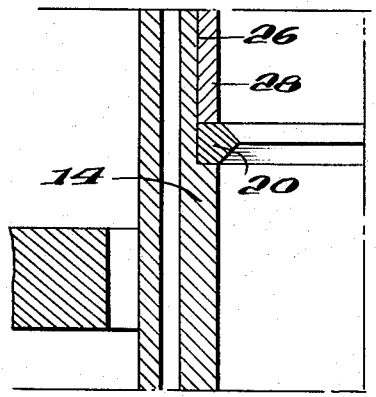
FIG. 7 shows a partial side elevation in section of another embodiment of an improved electrode of the present invention.

FIG. 7 shows another embodiment for positioning ring structure 20, in which the annular recess 26 extends upwardly from the ring structure, and the retaining sleeve 28 is positioned thereabove. According to this embodiment, the presence of a solid section of anode 14 beneath the ring structure results in more efficient cooling of this area and thus, easier removal of any hard carbon deposits which form thereat.

The preferred materials of fabrication of the ring structure of this invention are the arc-erosion resistant refractory metals such as tungsten or molybdenum or its alloys with titanium and zirconium; copper or its alloys may also be used, but this material is preferred for the fabrication of the various anodes 14 depicted. An example of a suitable refractory metal is TZM Molybdenum obtainable from Fansteel.

In operation, an arc 17 is struck between the cathode 12 and anode 14 and is rotated by the electromagnet 18. The hydrocarbon feed stock is then passed downwardly through the rotating arc whereupon pyrolysis to the desired product, e.g., acetylene, occurs. As this operation proceeds, a hard carbon deposit 30 forms on the lower exposed surface of the particular ring structure 20, 40, 50, 60, or equivalents thereof employed. Periodically, according to the frequency desired, a scraper, such as scraping member 32 is brought into contact with the deposit 30 to dislodge or scrape it from the ring structure surface, whereupon the scraper is retracted.

As shown in FIG. 1, the anode 14 is positioned within the arc furnace 10 by threaded engagement at 70 with an upper, flared section 72 thereof. A lower section 74 is provided to abut via a gasket 76 the lower edge of the anode 14. This manner of positioning the anode 14 within the arc furnace is only representative, as obviously many alternative arrangements are possible. The polarity of the electrodes can be reversed, and the present invention is still applicable. The present invention is not limited to any particular hydrocarbon material feedstock; some of the suitable feedstocks are methane and numbers 2 and 3 fuel oils.

As many widely different embodiments may be made without departing from the spirit and scope thereof, it is to be understood that this invention is not limited to the specific embodiments thereof except as defined in the appended claims.

What is claimed is:

1. In an arc furnace having a central electrode and an annular outer electrode, the improvement which comprises an annular ring structure extending inwardly from the inner surface of said outer electrode to form the arc-strike surface therefor, said annular ring structure being secured to the inner surface of said outer electrode transversely to the longitudinal axis of said outer electrode, said outer electrode having an annular recess at the upper end thereof and said ring structure having a base portion integrally secured within said recess whereby said hard carbon deposit forms substantially on the lower surface of said structure for easy removal therefrom.

2. The arc furnace of claim 1 wherein said annular recess extends below said base portion with means retaining said base in place positioned in said extended part of said recess.

3. The arc furnace of claim 1 wherein said annular recess extends above said base portion with means retaining said base in place positioned in said extended part of said recess.

4. The arc furnace of claim 1 wherein said ring structure is spaced from the iner surface of said outer electrode.

5. In an arc furnace for the pyrolysis of hydrocarbon to acetylene by passage of said hydrocarbon between a central cathode and a surrounding annular anode and through an electromagnetically rotated arc, whereupon hard carbon deposits form on said anode, the improvement comprising an annular ring structure projecting inwardly from the inner surface of said anode to form the arc-strike surface therefor, whereby said hard carbon deposit forms substantially on the lower surface of said ring structure for easy removal therefrom, said ring structure being secured to the inner surface of said anode transversely to the longitudinal axis of said anode, said anode having an annular recess and said ring structure having a base portion integrally secured within said recess, the upper surface of said ring structure having a substantially common boundary with the lower surface of said ring structure.

6. The arc furnace of claim 5 wherein said upper surface and said lower surface are planar and are convergent with respect to each other and said boundary is the apex therebetween.

References Cited
UNITED STATES PATENTS

| | | |
|---|---|---|
| 1,496,742 | 6/1924 | Riddick. |
| 2,862,099 | 11/1958 | Gage. |
| 2,863,738 | 12/1958 | Van Antwerp _____ 13—9 XR |
| 3,185,754 | 5/1965 | Doukas et al. _____ 13—9 |
| 3,209,059 | 9/1965 | Gleitz et al. _____ 13—9 |

FOREIGN PATENTS 226  1/1914  Great Britain.

BERNARD A. GILHEANY, *Primary Examiner.*

H. B. GILSON, *Assistant Examiner.*